（12） United States Patent
Murase et al.

(10) Patent No.: US 10,431,021 B2
(45) Date of Patent: Oct. 1, 2019

(54) ELECTRONIC CONTROL UNIT

(71) Applicant: DENSO CORPORATION, Kariya, Aichi-pref. (JP)

(72) Inventors: Yuichi Murase, Kariya (JP); Hiroyuki Enomoto, Kariya (JP)

(73) Assignee: DENSO CORPORATION, Kariya (JP)

(*) Notice: Subject to any disclaimer, the term of this patent is extended or adjusted under 35 U.S.C. 154(b) by 415 days.

(21) Appl. No.: 15/378,146

(22) Filed: Dec. 14, 2016

(65) Prior Publication Data

US 2017/0282817 A1 Oct. 5, 2017

(30) Foreign Application Priority Data

Apr. 5, 2016 (JP) ................................ 2016-076062

(51) Int. Cl.
*G07C 5/00* (2006.01)
*G07C 5/08* (2006.01)
*B60W 50/02* (2012.01)
*B60W 10/06* (2006.01)
*F02D 41/00* (2006.01)
*B60W 50/00* (2006.01)

(52) U.S. Cl.
CPC ........... *G07C 5/0808* (2013.01); *B60W 10/06* (2013.01); *B60W 50/0205* (2013.01); *F02D 41/00* (2013.01); *B60W 2050/0075* (2013.01)

(58) Field of Classification Search
USPC .......................................................... 701/23
See application file for complete search history.

(56) References Cited

U.S. PATENT DOCUMENTS

| | | |
|---|---|---|
| 2004/0080997 A1 | 4/2004 | Okada et al. |
| 2009/0254243 A1 | 10/2009 | Uchihashi et al. |
| 2011/0295457 A1* | 12/2011 | Linda ................... B60T 8/172 701/498 |
| 2012/0095630 A1* | 4/2012 | Muto .................... B60K 6/46 701/22 |
| 2017/0225689 A1* | 8/2017 | Mukai .................. B60W 20/11 |
| 2018/0210443 A1* | 7/2018 | Matsuzaki ........... G05D 1/0212 |

* cited by examiner

*Primary Examiner* — James M McPherson
(74) *Attorney, Agent, or Firm* — Posz Law Group, PLC

(57) ABSTRACT

A driving mode setting part sets a driving mode when a vehicle travels by automatic driving. An item setting part sets a prioritized diagnosis. A storage part stores plural diagnosis conditions provided in correspondence to each diagnosis item. A target setting part sets a control target value. A motive power source part controls a motive power source based on the control target value. Each diagnosis item is assigned to the driving mode, for which the diagnosis condition is most easily satisfied. The item setting part sets, as a prioritized item, the diagnosis item assigned to the set driving mode. When the prioritized item is set, the target setting part sets the control target value so that the motive power source attains a state, which is close to the diagnosis condition of the prioritized item.

16 Claims, 10 Drawing Sheets

FIG. 3

| DRIVING MODE | DIAGNOSIS ITEM | DETECTION STATE | ITEM VARIABLE | ITEM NUMBER | |
|---|---|---|---|---|---|
| ACCELERATION | CATALYST DETERIORATION | FINISHED | i1 | 0 | ⎫<br>⎬ N1<br>⎭ |
| | A/F RESPONSE DEGRADATION | UNFINISHED | | 1 | |
| | ... | ... | | ... | |
| CONSTANT SPEED | IMBALANCE | FINISHED | i2 | 0 | ⎫<br>⎬ N2<br>⎭ |
| | PURGE VSV ABNORMALITY | UNFINISHED | | 1 | |
| | ... | ... | | ... | |
| DECELERATION | EGR ABNORMALITY | FINISHED | i3 | 0 | ⎫<br>⎬ N3<br>⎭ |
| | A/F IL CHANGE | UNFINISHED | | 1 | |
| | ... | ... | | ... | |
| STOP | SECONDARY AIR ABNORMALITY | FINISHED | i4 | 0 | ⎫<br>⎬ N4<br>⎭ |
| | SOLENOID ABNORMALITY | UNFINISHED | | 1 | |
| | ... | ... | | ... | |

FIG. 4

| DIAGNOSIS ITEM \ STATE | THROTTLE ANGLE | GEAR RATIO | A/F | ENGINE SPEED | ... | INTAKE AIR TEMP | ENGINE TEMP | ATMOSPHERIC PRESSURE | ... |
|---|---|---|---|---|---|---|---|---|---|
| STATE NUMBER (STATE VARIABLE j) | 0 | 1 | 2 | 3 | ... | | | | ... |
| CATALYST DETERIORATION | 30° – 40° | THIRD OR HIGHER | 13.5 – 15.5 | 1500 – 3000rpm | ... | −10°C OR HIGHER | 70°C OR HIGHER | 75kPa OR HIGHER | ... |
| EGR ABNORMALITY | SMALLER THAN 3° | N/A | N/A | 2500 – 4000rpm | ... | −10°C OR HIGHER | 75°C OR HIGHER | N/A | ... |
| SECONDARY AIR ABNORMALITY | N/A | N/A | N/A | 550 rpm OR HIGHER | ... | N/A | −5°C – 60°C | 75kPa OR HIGHER | ... |
| ... | ... | ... | ... | ... | ... | ... | ... | ... | ... |

CONTROLLABLE CONDITION (M)  
UNCONTROLLABLE CONDITION

ELECTRONIC CONTROL UNIT

CROSS REFERENCE TO RELATED APPLICATION

This application is based on Japanese patent application No. 2016-76062 filed on Apr. 5, 2016, the whole contents of which are incorporated herein by reference.

FIELD

The present disclosure relates to an electronic control unit for a vehicle, which travels by automatic driving and performs diagnosis on plural diagnosis items to check whether any abnormality is present.

BACKGROUND

As disclosed in JP 2004-164601A (US 2004/0080997A), a conventional electronic control unit (ECU) controls an internal combustion engine provided as a motive power source. The ECU has a microcomputer, which controls the engine and performs failure diagnosis.

The microcomputer checks whether a failure diagnosis execution condition (diagnosis condition) of each item of diagnosis among plural failure diagnosis items. The microcomputer performs failure diagnosis processing of each diagnosis item, for which the failure diagnosis execution condition is satisfied.

It is assumed that one trip of a vehicle covers a period from turning-on to turning-off of an ignition switch of the vehicle and the number of trips is incremented by one in the period from turning-on to turning-off of the ignition switch. It is further assumed that a diagnosis execution rate of the number of execution of diagnoses relative to the number of trips. The diagnosis execution rateBase monitor method defines that the diagnosis execution rate need be equal to or larger than a predetermined value. It is necessary to make more trips to perform the failure diagnosis processing so that a required diagnosis execution rate value may be attained.

It is proposed recently to drive a vehicle automatically. An ECU for such a vehicle is configured to drive the vehicle automatically so that the failure diagnosis execution condition is satisfied for attaining the required execution rate value. In this case, the ECU controls the engine differently from normal automatic driving thereby to satisfy the failure diagnosis execution condition. When the engine is controlled differently from the normal automatic driving, riding comfortableness of the vehicle is degraded.

SUMMARY

It is therefore an object to provide an electronic control unit, which attains a required diagnosis execution rate value and riding comfortableness of a vehicle.

According to one aspect, an electronic control unit is provided for a vehicle, which travels by automatic driving and performs diagnosis about plural diagnosis items for diagnosing presence or absence of abnormality. The electronic control unit receives at least one of surrounding environment information indicating a surrounding environment of the vehicle and vehicle speed information indicating a vehicle speed from an external device and controlling a motive power source of the vehicle based on at least one of the surrounding environment information and the vehicle speed information.

The electronic control unit comprises a mode setting part, an item setting part, a storage part, a target setting par, a motive power source control part. The mode setting part sets a driving mode indicating a travel state of the vehicle based on at least one of the vehicle information and the surrounding environment information when the vehicle travels by the automatic driving. The item setting part sets one of the plural diagnosis items as a prioritized item, which is diagnosed with priority. The storage part stores plural diagnosis conditions in correspondence to each diagnosis item for starting diagnosis of the vehicle. The diagnosis conditions are conditions indicating a vehicle operation state. The target setting part sets a control target value, which is a target value for controlling the motive power source. The motive power source control part controls the motive power source based on the control target value.

In the electronic control unit, each of the diagnosis items is assigned to the driving mode, which is most easily satisfied, the item setting part sets the diagnosis item, which is assigned to a set driving mode, as the prioritized item, when the set driving mode is set by the mode setting part, and the target setting part sets the control target value so that the motive power source is controlled to attain a state, which is close to the diagnosis condition of the prioritized item, when the prioritized item is set by the item setting part.

BRIEF DESCRIPTION OF THE DRAWINGS

FIG. 3 is a table showing relations among a driving mode, diagnosis items and detection states;

FIG. 4 is a table showing a diagnosis condition for each diagnosis item;

DETAILED DESCRIPTION OF EMBODIMENT

Figure 1:
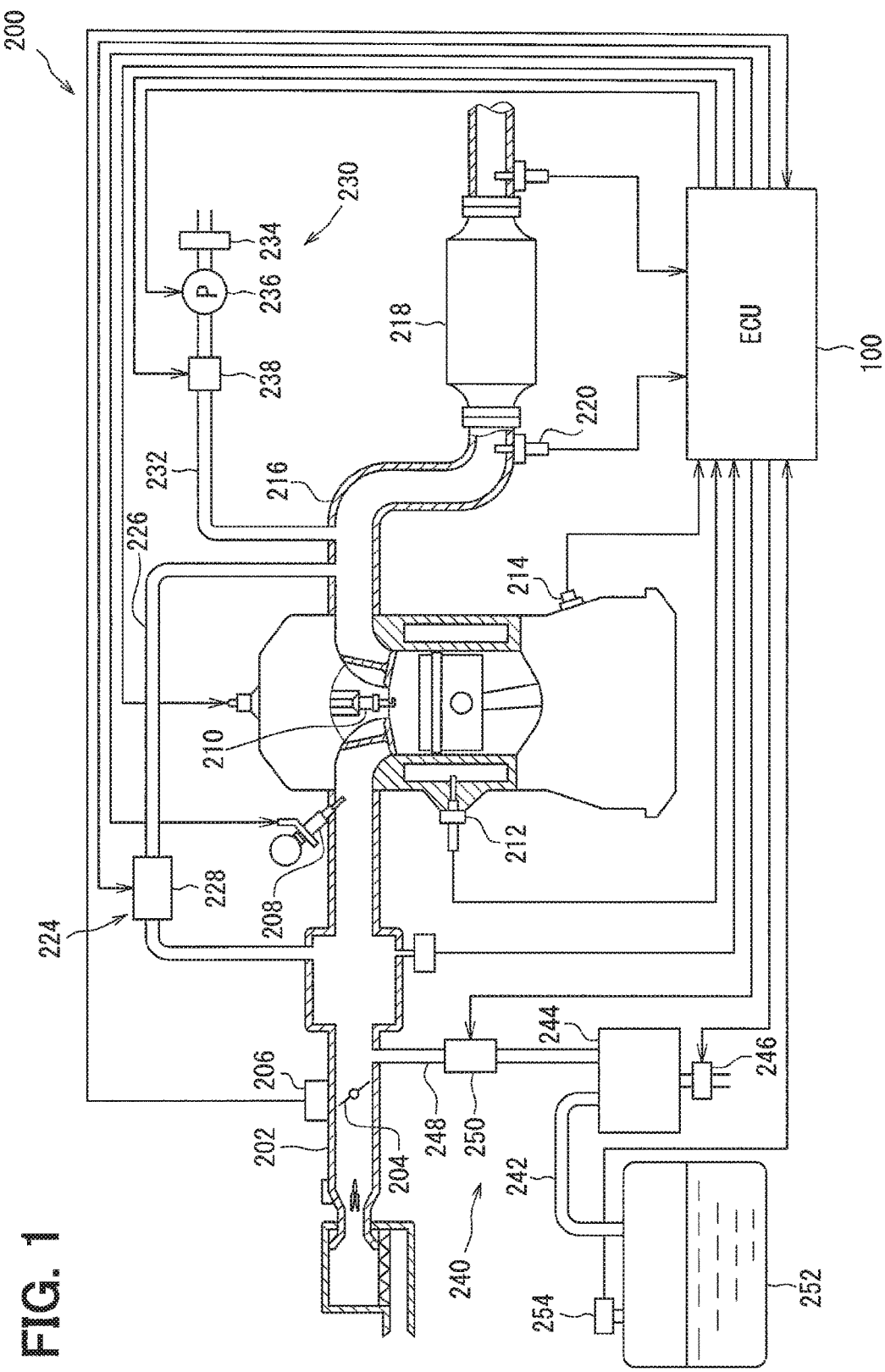
FIG. 1 is a schematic diagram showing a general configuration of a motive power source system including an ECU according to a first embodiment.

In the drawings, same or corresponding structural parts are designated with same reference numerals for simplification of description.

Referring to FIG. 1, an electronic control unit (ECU) 100 is provided for a vehicle. That is, the ECU 100 is provided in the vehicle. The vehicle, in which the ECU 100 is provided, is capable of traveling by automatic driving. That is, the vehicle provided with the ECU 100 has an automatic driving function, by which the vehicle is driven automatically to travel without driver's driving operation. The vehicle provided with the ECU 100 is referred to as a subject vehicle in the following description. The vehicle may be a gasoline-engine car, a hybrid car, an electric car and the like.

The vehicle is provided with a motive power source 200. The ECU 100 is provided for the motive power source 200. The ECU 100 is also referred to as a motive power source control ECU. The ECU 100 includes a microcomputer, memories, interfaces and the like. In the present embodiment, the motive power source 200 is an internal combustion engine. Without limitation to the engine, the motive power source 200 may be an electric driving apparatus in a case that the vehicle is a hybrid car or an electric car.

In an air intake pipe 202 of the motive power source 200, a throttle valve 204 and an open angle sensor for detecting a throttle open angle of the throttle valve 204 are provided. Near an intake port of an intake manifold of each cylinder, a fuel injection valve 208 is attached for injecting fuel.

On a cylinder head of the motive power source 200, a spark plug 210 is mounted for each cylinder. Air-fuel mixture in the cylinder is ignited by spark discharge of the Ignition plug 210. On a cylinder block of the motive power source 200, a coolant temperature sensor 212 for detecting temperature of a water coolant and a crank angle sensor 214 for detecting an engine rotation speed are provided.

On an exhaust pipe 216 of the motive power source 200, a catalyst 218 is provided. The catalyst 218 reduces CO, HC and NOx in exhaust gas. At an upstream side of the catalyst 218 an air-fuel ratio (A/F) sensor 220 is provided for detecting an air-fuel ratio. The motive power source 200 is further provided with an exhaust gas recirculation (EGR) system 224.

The EGR system 224 is formed of an EGR pipe 226 and an EGR valve 228. The EGR pipe 226 is provided between an upstream side of the catalyst 218 in the exhaust pipe 216 and a downstream side of the throttle valve 204 in the air intake pipe 202. Thus a part of the exhaust gas is recirculated from the exhaust side to the air intake side. The EGR valve 228 is provided at a midway position of the EGR pipe 226. The EGR valve 228 controls an amount of recirculation of the exhaust gas. The EGR system 224 is referred to as an exhaust gas recirculation system.

In the motive power source 200, a secondary air system 230 is provided. The secondary air system 230 includes an air introduction pipe 232, an air filter 234, an air pump 236 and a valve 238. The air introduction pipe 232 is connected to the upstream side of the catalyst 218 in the exhaust pipe 216. In the secondary air system 230, the air introduction pipe 232 introduces atmospheric air as secondary air. The air filter 234, the air pump 236 and the valve 238 are provided in the air introduction pipe 232. At the downstream side of the air filter 234, the air pump 236 is provided. The air pump 236 supplies pressurized secondary air. At the downstream side of the air pump 236, the valve 238 is provided.

In the motive power source 200, an evaporation gas purge system 240 is further provided. The purge system 240 includes an evaporation passage 242, a canister 244, an air on-off valve 246, a purge passage 248 and a purge vacuum switching valve (VSV) 250. The canister 244 is connected to a fuel tank 252 through the evaporation passage 242. In the canister 244, an adsorbent such as activated carbon is accommodated to adsorb evaporation gas generated in the fuel tank 252. An air communication hole of the canister 244 is opened and closed by the air on-off valve 246.

The purge passage 248 is provided between the canister 244 and the air intake pipe 202 for purging the evaporation gas into the air intake pipe 202. The purge VSV 250 is provided at a midway position of the purge passage 248. A tank inside pressure sensor 254 is provided in the fuel tank 252 to detect an inside pressure of the fuel tank 252.

Figure 2:
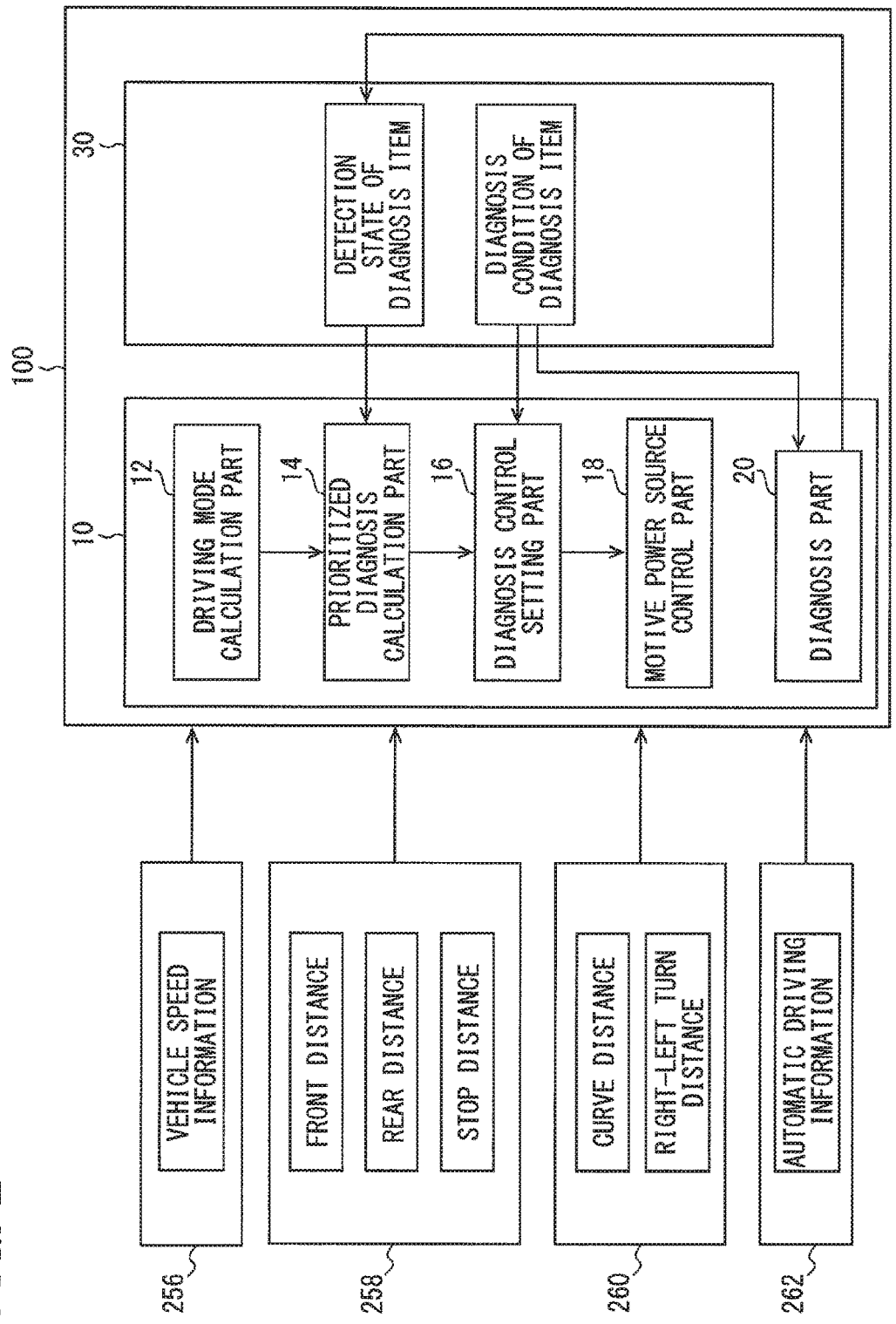
FIG. 2 is a block diagram showing a general configuration of the ECU shown in FIG. 1.

The ECU 100 is connected to plural sensors shown in FIG. 1 and described above. Further, as shown in FIG. 2, the ECU 100 is connected to a vehicle speed sensor 256, a driving support ECU 258, a car navigation device 260 and an automatic driving button 262. The ECU 100 receives vehicle speed information, which indicates a present vehicle speed, from the vehicle speed sensor 256.

The ECU 100 receives information of a candidate position, which is a candidate of changing a travel state of a vehicle, from the driving support ECU 258 and the car navigation device 260. That is, the ECU 100 acquires the candidate position information from the driving support ECU 258 and the car navigation device 260.

The automatic driving button 262 is provided to output automatic driving execution information, which indicates whether the vehicle is driven by automatic driving. That is, the ECU 100 acquires the automatic driving information from the automatic driving button 262. More specifically, the automatic driving button 262 is provided for a driver to select whether the vehicle should be driven automatically without driver's operation on a steering wheel, an accelerator pedal and a brake pedal. The automatic driving button 262 is configured to turn on and off when the automatic driving of the vehicle is selected and not selected, respectively. The on-off state of the automatic driving button 262 is the automatic driving information.

The driving support ECU 258 is connected to a radar, a camera or the like, which detects information about a surrounding environment of the vehicle. The driving support ECU 258 calculates a distance and the like from the subject vehicle to the candidate position based on a signal from the radar, camera or the like. More specifically, the driving support ECU 258 calculates a front distance, a rear distance and a stop distance based on signals from the radar, camera or the like. The driving support ECU 258 outputs signals indicating calculated front distance, rear distance and stop distance to the ECU 100 through CAN (registered trademark).

The front distance is a distance from the subject vehicle to an obstacle, which exists in the forward direction of the subject vehicle. The position of the obstacle is the candidate position. The rear distance is a distance from the subject vehicle to a rear vehicle, which follows the subject vehicle. The stop distance is a distance from the subject vehicle to a temporary stop position. The temporary stop position is the candidate position.

The car navigation device 260 outputs information about the surrounding environment of the vehicle to the ECU 100. More specifically, the car navigation device 260 calculates a curve distance and right-left turn distance. The ECU 260 outputs signals indicating calculated curve distance and right-left turn distance to the ECU 100 through CAN.

The curve distance is a distance from the subject vehicle to a position, where the subject vehicle will curve next. The position, which the subject vehicle will curve, is the candidate position. The right-left turn distance is a distance from the subject vehicle to a position, where the subject vehicle will make a right turn or a left turn next. The position, which the subject vehicle will make the right turn or the left turn is the candidate position. The information, which indicate the front distance, the rear distance, the stop distance, the curve distance and the right-left turn distance, is referred to as distance information collectively.

The information inputted from the driving support ECU 258 and the car navigation device 260 to the ECU 100 is surrounding environment information. The vehicle speed sensor 256, the driving support ECU 258 and the car navigation device 260 are external devices.

The ECU 100 not only controls the motive power source 200 but also performs diagnosis about the vehicle. That is, the ECU 100 not only controls the motive power source 200 but also diagnoses whether any failure is present in the vehicle. The failure diagnosis performed by the ECU 100 is referred to as diagnosis. The items, on which the ECU 100 performs the failure diagnosis, are determined by law or regulation. The item, on which the ECU 100 performs the failure diagnosis, is referred to as a diagnosis item. As shown in FIG. 3, the ECU 100 performs the failure diagnoses on plural diagnosis items.

As shown in FIG. 4, a predetermined diagnosis condition, under which the ECU 100 starts the diagnosis, is set for each diagnosis item. That is, the ECU 100 starts the diagnosis on the diagnosis item, for which the predetermined diagnosis condition is satisfied. The predetermined diagnosis condition is set based on a vehicle operation state.

The diagnosis condition includes a controllable condition, which is set to be controllable by the ECU 100, and an uncontrollable condition, which is set to be uncontrollable by the ECU 100. The controllable condition is an engine rotation speed, for example. The uncontrollable condition is an atmospheric pressure, for example. In FIG. 4, "N/A" indicates no required condition. That is, the diagnosis item, for which the diagnosis condition is indicated as N/A, the diagnosis condition is satisfied irrespective of the vehicle operation state corresponding to N/A.

In the present embodiment, the number of vehicle operation states, which define the controllable conditions, is "M". Each vehicle operation state, which defines the controllable condition, is identified by one of integer numbers from 0 to M−1 as a state number. The state number is used by a diagnosis control setting part 16 to set a control target value as described below. Further, a state variable "j" is pre-stored for managing the state number as described later. The state variable j is varied from 0 to M.

In the present embodiment, as shown in FIG. 2, the ECU 100 includes a calculation part 10 and a storage part 30. The calculation part 10 includes a driving mode calculation part 12, a prioritized diagnosis calculation part 14, a diagnosis control setting part 16, a motive power source control part 18 and a diagnosis part 20. The calculation part 10 may be a central processing unit (CPU) of a microcomputer and each of the parts 12, 14, 16, 18 and 20 of the calculation part 10 may be implemented as a control program, which is executed by the CPU.

The driving mode calculation part 12 calculates a driving mode, which indicates a travel mode of the vehicle. That is, the driving mode calculation part 12 sets the driving mode. The driving mode indicates the travel mode of the vehicle from the present position to the candidate position in a case that the vehicle travels by automatic driving. The driving mode calculation part 12 calculates the driving mode based on the vehicle speed information and the distance information. In the present embodiment, the driving mode calculation part 12 further checks whether the vehicle is traveling by automatic driving. The driving mode calculation part 12 is a mode setting part.

As shown in FIG. 3, the driving mode calculation part 12 sets as plural driving modes an acceleration mode, a constant speed mode, a deceleration mode and a stop mode, for example. The acceleration mode is set mainly when the vehicle starts to accelerate. The constant speed mode is one example of a cruise mode and set mainly when the vehicle maintains the present vehicle speed, for example. The deceleration mode is set mainly when the vehicle starts to decelerate. The stop mode is set when the vehicle is at rest. As shown in FIG. 3, plural diagnosis items are assigned for each driving mode. Each diagnosis item is assigned to one of the plural driving modes, in which the diagnosis condition of the subject diagnosis item exemplified in FIG. 3 is most easily satisfied.

For the acceleration mode, the diagnosis items include detection of deterioration of the catalyst 218, detection of degradation of response characteristic of the A/F sensor 220 and the like. The detection of deterioration of the catalyst 218 is the diagnosis item, which detects deterioration of a performance of the catalyst 218. The detection of degradation of the response characteristic of the A/F sensor 220 is the diagnosis item, which detects a delay in output timing of an output signal of the A/F sensor 220. N1-pieces of diagnosis items are assigned for the acceleration mode.

For the constant speed mode, the diagnosis items include detection of imbalance, detection of abnormality of the purge VSV 250 and the like. The detection of imbalance is the diagnosis item, which detects imbalance of air-fuel ratios in each cylinder of the motive power source 200. The detection of abnormality of the purge VSV 250 is the diagnosis item, which detects an abnormality of on-off operation of the purge VSV 250. N2-pieces of diagnosis items are assigned for the constant speed mode.

For the deceleration mode, the diagnosis items include detection of abnormality of the EGR system 224, detection of increase or decrease of a limit current (IL) flowing in the A/F sensor 220 at air-fuel ratio detection time and the like. The detection of abnormality of the EGR system 224 is the diagnosis item, which detects a decrease of flow amount of the exhaust gas in the EGR pipe 226. The detection of increase and decrease of IL of the A/F sensor 220 is the diagnosis item, which detects that the limit current value of the A/F sensor 220 increases or decreases from a normal current value. N3-pieces of diagnosis items are assigned for the deceleration mode.

For the stop mode, the diagnosis items include detection of abnormality of the secondary air system 230, detection of abnormality of a solenoid and the like. The detection of abnormality of the secondary air system 230 is the diagnosis item, which detects abnormality of operation of the air pump 236 or the valve 238. The detection of abnormality of the solenoid is the diagnosis item, which detects a disconnection or shorting of a solenoid provided for controlling a hydraulic pressure of a shift valve of a gear transmission. N4-pieces of diagnosis items are assigned for the stop mode.

Each diagnosis item is identified by the item number. The item number is assigned to be used by the prioritized diagnosis calculation part 14 for calculating the following prioritized diagnosis. The storage part 30 stores plural item variables for managing the item number. The storage part 30 stores the item variables, which correspond to the driving modes.

The item variable i1 corresponds to the acceleration mode. The diagnosis items assigned for the acceleration mode are identified by integer numbers from 0 to N1−1 as item numbers, respectively. The item variable i1 varies its value from 0 to N1−1.

The item variable i2 corresponds to the constant speed mode. The diagnosis items assigned for the constant speed mode are identified by integer numbers from 0 to N2−1 as item numbers, respectively. The item variable i2 varies its value from 0 to N2−1.

The item variable i3 corresponds to the deceleration mode. The diagnosis items assigned for the deceleration mode are identified by integer numbers from 0 to N3−1 as item numbers, respectively. The item variable i3 varies its value from 0 to N3−1.

The item variable i4 corresponds to the stop mode. The diagnosis items assigned for the stop mode are identified by integer numbers from 0 to N4−1 as item numbers, respectively. The item variable i4 varies its value from 0 to N4−1.

Referring to FIG. 2 again, the prioritized diagnosis calculation part 14 calculates the prioritized diagnosis. That is, the prioritized diagnosis calculation part 14 sets the prioritized diagnosis. The prioritized diagnosis is a diagnosis item, which is diagnosed with priority over other diagnosis items among all the diagnosis items. The prioritized diagnosis calculation part 14 sets one diagnosis item as the prioritized diagnosis out of all the diagnosis items. The prioritized diagnosis calculation part 14 sets the prioritized diagnosis based on the driving mode, which is set by the driving mode calculation part 12. The prioritized diagnosis corresponds to a prioritized item. The prioritized diagnosis calculation part 14 is an item setting part.

The diagnosis control setting part 16 sets a control target value of the motive power source control part 18 so that the diagnosis condition of the prioritized diagnosis set by the prioritized diagnosis calculation part 14 may be satisfied. More specifically, the diagnosis control setting part 16 sets the control target value so that the controllable condition among the diagnosis condition of the prioritized diagnosis set by the prioritized diagnosis calculation part 14 may be satisfied. The diagnosis control setting part 16 is a target setting part.

The motive power source control part 18 controls the motive power source 200. The motive power source control part 18 controls the motive power source 200 so that the state of the motive power source 200 match the control target value. The state of the motive power source 200 is, for example, an engine rotation speed, throttle angle, transmission gear ratio and the like. The controllable condition is set relative to an operation state, which the motive power source control part 18 can control the motive power source 200 to attain. The uncontrollable condition is set relative to a state, which the motive power source control part 18 cannot control the motive power source 200 to attain. The control target value is set for each vehicle operation state, for which the controllable condition is set.

The diagnosis part 20 performs diagnosis about each diagnosis item, the diagnosis condition of which is satisfied. That is, the diagnosis part 20 detects the diagnosis item, the diagnosis condition of which is satisfied. The diagnosis part 20 checks whether the diagnosis condition is satisfied by comparing the diagnosis condition with the vehicle operation state corresponding to the diagnosis condition. When it is determined that the diagnosis condition is satisfied, the diagnosis part 20 detects a state of the diagnosis item.

The diagnosis part 20 stores a detected state of the diagnosis item in the storage part 30. The detected state indicates whether the detection of diagnosis item by the diagnosis part 20 is finished. The prioritized diagnosis calculation part 14 acquires the detected state of each diagnosis item from the storage part 30 and calculates the prioritized diagnosis based on the acquired detected state.

The diagnosis condition of each diagnosis item is stored in the storage part 30. The diagnosis control setting part 16 acquires the diagnosis condition of the diagnosis item from the storage part 30 and sets the control target value based on the acquired diagnosis condition. The diagnosis part 20 acquires the diagnosis condition from the diagnosis item from the storage part 30 and checks whether the diagnosis condition of the diagnosis item is satisfied based on the acquired diagnosis condition.

When the detection of prioritized diagnosis is finished by the diagnosis part 20, the diagnosis execution rate value is increased. The processing of the ECU 100, which calculates the driving mode, calculates the prioritized diagnosis and sets the control target value, is referred to as diagnosis execution rate increase processing. The diagnosis execution rate increase processing is diagnosis execution rate improvement processing.

The diagnosis execution rate increase processing of the ECU 100 will be described with reference to FIG. 5 to FIG. 8.

Figure 5:
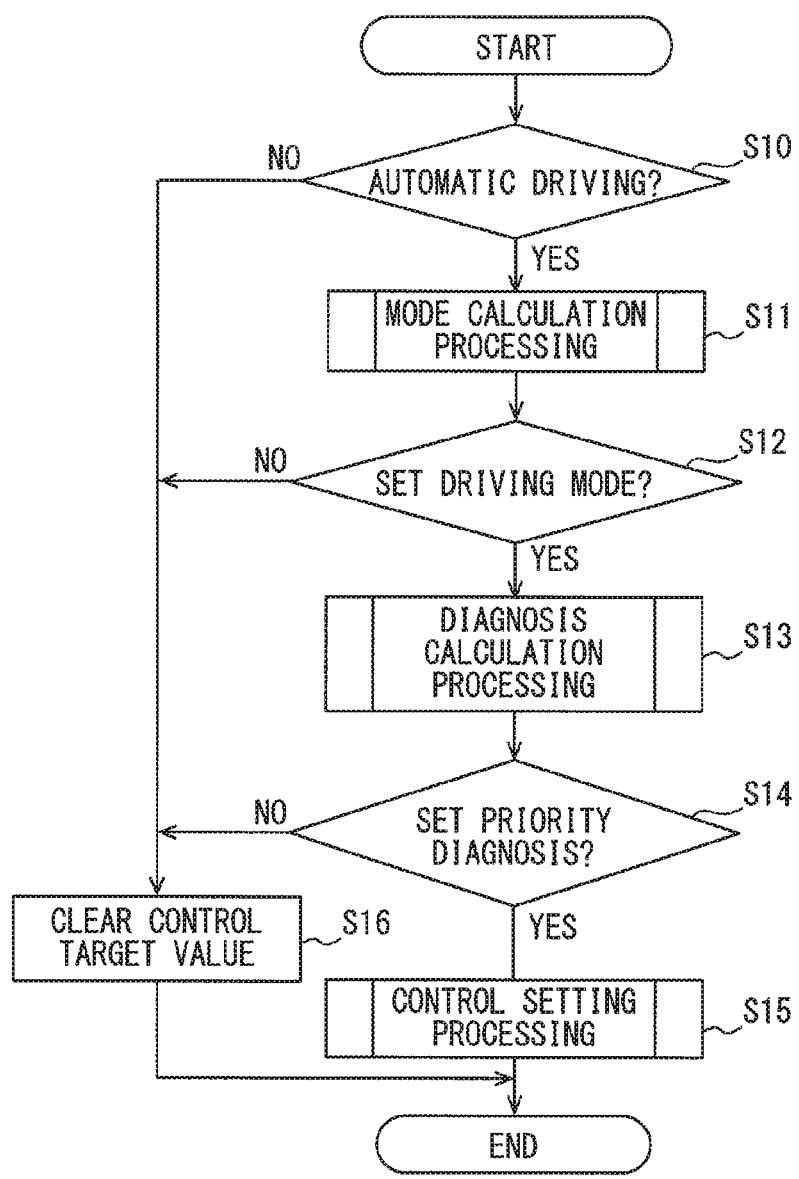
FIG. 5 is a flowchart showing steps of diagnosis execution rate improvement processing.

The ECU 100 starts the diagnosis execution rate increase processing at a predetermined cycle period, for example. That is, the ECU 100 repetitively performs the diagnosis execution rate increase processing. In the diagnosis execution rate increase processing, as shown in FIG. 5, the driving mode calculation part 12 first checks at S10 whether the vehicle is traveling under automatic driving based on the automatic driving information. The driving mode calculation part 12 determines that the vehicle is under travel of automatic driving when, for example, the automatic driving button 262 is in the on-state and the accelerator pedal is not pressed down by the driver. The driving mode calculation part 12 determines that the vehicle is under travel of driver's own driving operation when, for example, the automatic driving button 262 is in the off-state and the accelerator pedal is pressed down by the driver.

Figure 6:
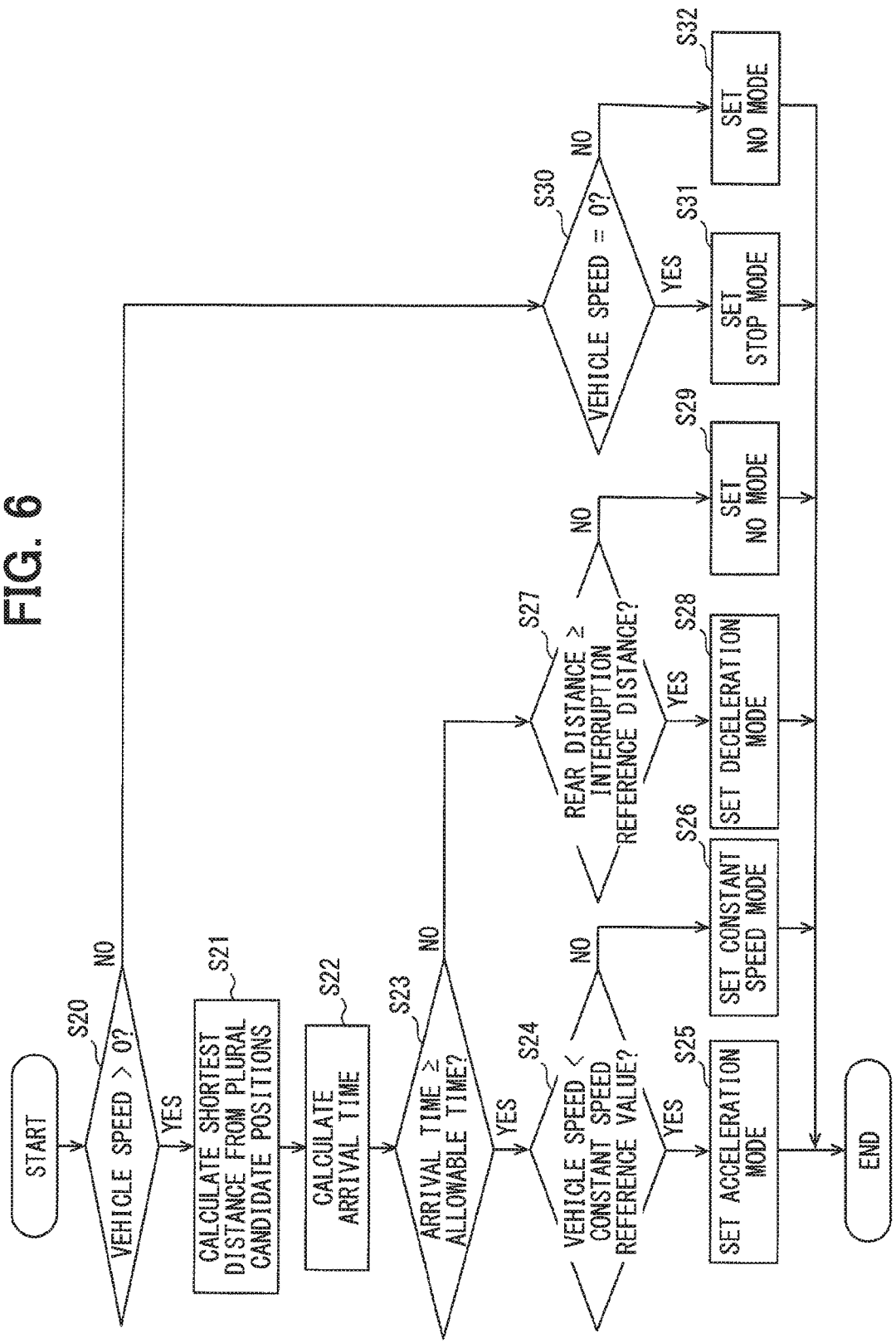
FIG. 6 is a flowchart showing steps of driving mode calculation processing.

Upon determination at S10 that the vehicle is under travel by the automatic driving (YES), the driving mode calculation part 12 executes at S11 the mode calculation processing shown in FIG. 6. The mode calculation processing is processing, in which the driving mode calculation part 12 calculates the driving mode.

In the mode calculation processing of FIG. 6, the driving mode calculation part 12 first checks at S20 whether the present vehicle speed of the vehicle is a positive value or a negative value based on the vehicle speed information. Even in a case that the vehicle is in a rearward movement, the vehicle speed is made to be a positive value. For this reason, when the vehicle speed is a negative value, it is assumed that the vehicle speed information indicates an abnormal value.

Upon determination at S20 that the present vehicle speed is the positive value (YES), the driving mode calculation part 12 calculates at S21 a shortest distance to the candidate position. More specifically, the driving mode calculation part 12 acquires at S21 the distance information from the driving support ECU 258 and the car navigation device 260. The driving mode calculation part 12 compares the lengths of right-left distance, stop distance, curve distance and obstacle distance each other and determines the shortest distance among these four distances. More specifically, the driving mode calculation part 12 selects the shortest distance to the subject vehicle out of the right-left distance, stop distance, curve distance and obstacle distance.

Then the driving mode calculation part 12 calculates at S22 an arrival time, which indicates a time interval required for the subject vehicle to arrive at the position of the shortest distance calculated at S21. More specifically, the driving mode calculation part 12 calculates the arrival time by dividing the shortest distance calculated at S21 by the present vehicle speed. That is, the arrival time is determined by dividing the shortest distance calculated at S21 by the driving mode calculation part 12 by the present vehicle speed.

The driving mode calculation part 12 next checks at S23 whether the arrival time is equal to or longer than allowable time. The allowable time is a threshold value, which is provided for determining a length of the arrival time. The driving mode calculation part 12 varies the length of the allowable time with, for example, the present vehicle speed. The allowable time is a time threshold value.

Upon determination at S23 that the arrival time is equal to or longer than the allowable time (YES), the driving mode calculation part 12 checks at S24 whether the present vehicle speed is higher or lower than a constant speed reference value. The constant speed reference value is a threshold value provided to check the present vehicle speed. The driving mode calculation part 12 varies the constant speed reference value with, for example, speed limit information of a road, on which the vehicle is traveling. The constant speed reference value is a speed threshold value.

Upon determination at S24 that the present vehicle speed is lower than the constant speed reference value (YES), the driving mode calculation part 12 sets at S25 the driving mode to the acceleration mode. After execution of processing of S25, the driving mode calculation part 12 finishes the mode calculation processing.

Upon determination at S24 that the present vehicle speed is equal to or higher than the constant speed reference value (NO), the driving mode calculation part 12 sets at S26 the driving mode to the constant speed mode. After execution of processing of S26, the driving mode calculation part 12 finishes the mode calculation processing.

Upon determination at S23 that the arrival time is shorter than the allowable time, the driving mode calculation part 12 checks at S27 whether the rear distance is equal to or longer than an interruption check distance. The interruption check distance is a threshold value provided for checking a length of the rear distance to the rear following vehicle. The driving mode calculation part 12 varies a length of the Interruption check distance with, for example, the present vehicle speed. The interruption check distance is a distance threshold value.

Upon determination at S27 that the rear distance is equal to or longer than the interruption check distance (YES), the driving mode calculation part 12 sets at S28 the driving mode to the deceleration mode. After execution of processing of S28, the driving mode calculation part 12 finishes the mode calculation processing.

For example, the driving mode calculation part 12 sets the allowable time to 30 seconds (30 s) and the interruption check distance to 20 meters (20 m) when the present vehicle speed is 60 kilometers per hour (60 km/h). At this time, the driving mode calculation part 12 sets the arrival time to 15 seconds at S22 when the shortest distance calculated at S21 is 250 meters. The rear distance is set to 40 meters. In this example, the driving mode calculation part 12 determines at S23 that the arrival time is shorter than the allowable time and finishes processing of S27. The driving mode calculation part 12 then determines at S27 that the rear distance is equal to or longer than the interruption check distance (YES) and executes processing of S28. That is, the driving mode calculation part 12 sets the driving mode to the deceleration mode.

Upon determination at S27 that the rear distance is shorter than the interruption distance (NO), the driving mode calculation part 12 does not set at S29 the driving mode. Accordingly, when the arrival time is shorter than the allowable time (S23: NO) and the rear distance is shorter than the Interruption check distance (S27: NO), the driving mode calculation part 12 does not set the driving mode. The driving mode calculation part 12 finishes the mode calculation processing after execution of the processing of S29.

Even when the driving mode calculation part 12 does not set the driving mode, the vehicle travels by automatic driving.

Upon determination at S20 that the present vehicle speed is not the positive value (NO), the driving mode calculation part 12 checks at S30 whether the present vehicle speed is 0 km/h. That is, the driving mode calculation part 12 checks whether the vehicle is at rest, that is, stopped.

Upon determination at S30 that the present vehicle speed is 0 km/h (YES), the driving mode calculation part 12 sets at S31 the driving mode to the vehicle stop mode. The driving mode calculation part 12 finishes the mode calculation processing after execution of the processing of S31.

Upon determination at S30 that the present vehicle speed is the negative value (NO), the driving mode calculation part 12 does not set at S32 the driving mode. Accordingly, the driving mode calculation part 12 does not set the driving mode when the vehicle speed information indicates an abnormal value. The driving mode calculation part 12 finishes the mode calculation processing after execution of S32.

After finishing the mode calculation processing shown in FIG. 6, the driving mode calculation part 12 outputs a signal to the prioritized diagnosis calculation part 14. The prioritized diagnosis calculation part 14 checks at S12 in FIG. 5, based on the output signal of the driving mode calculation part 12, whether the driving mode has been set.

Figure 7A:
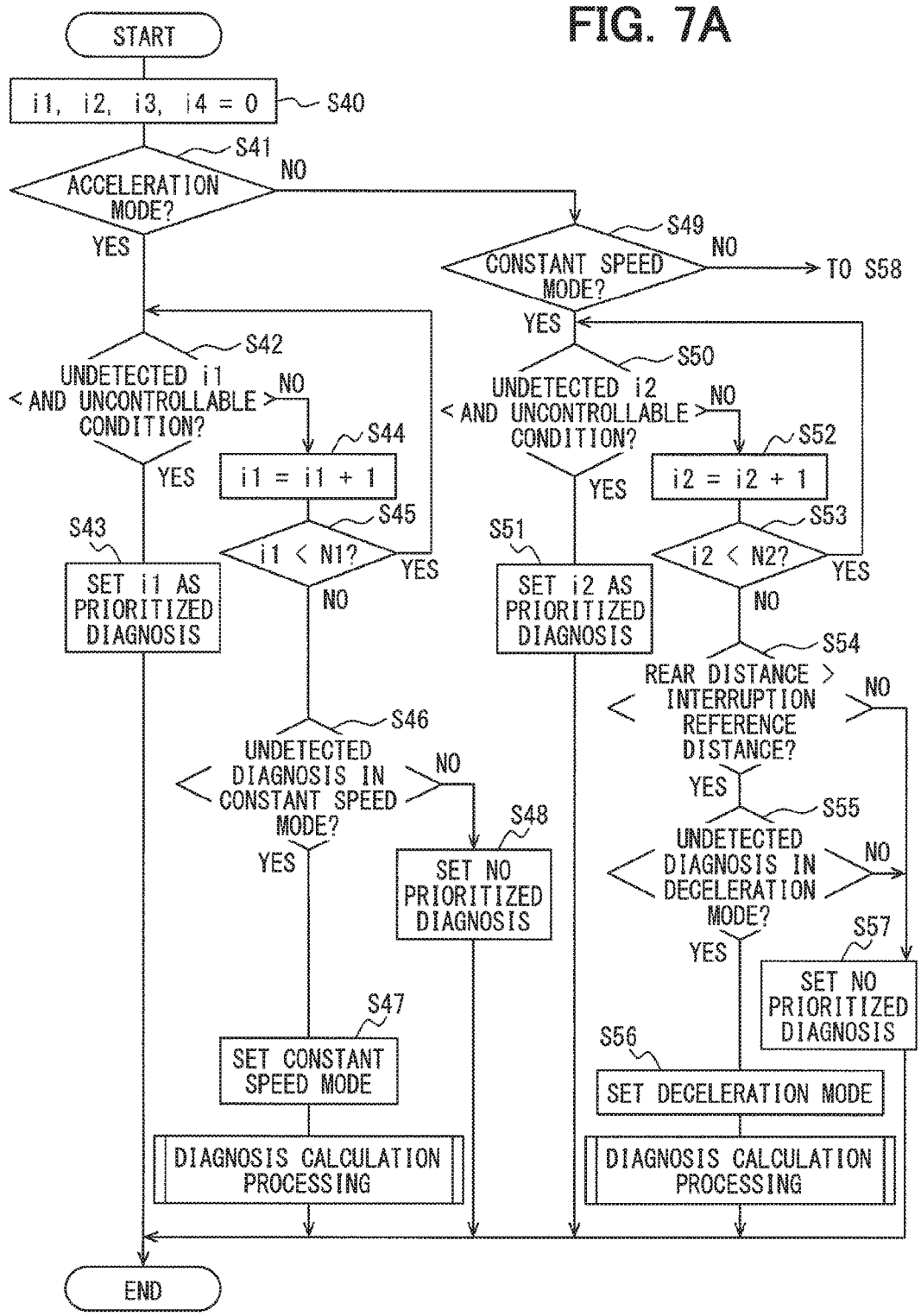
FIG. 7A and FIG. 7B are flowcharts showing steps of diagnosis calculation processing.
Figure 7B:
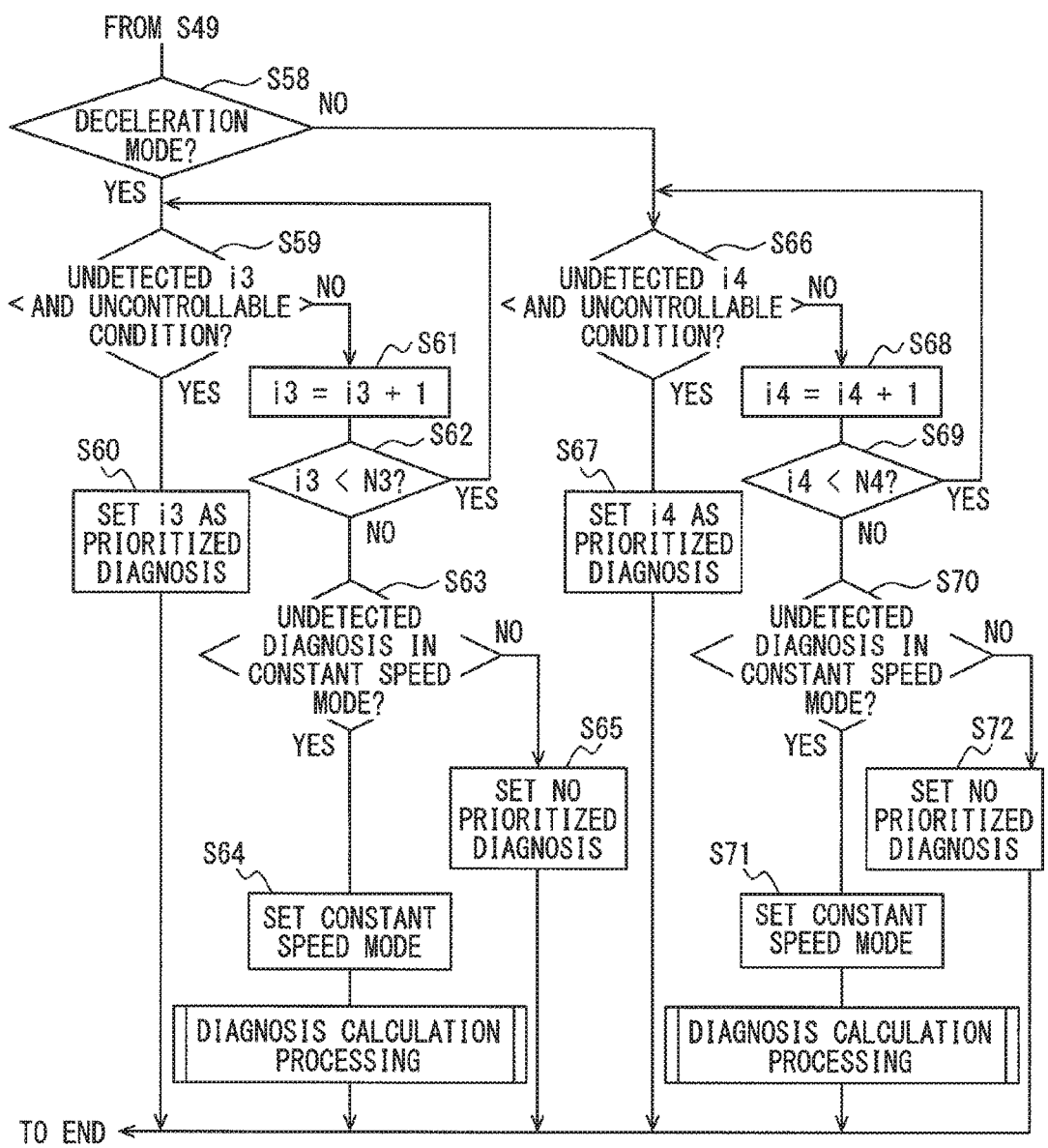

Upon determination at S12 that the prioritized diagnosis has been set (YES), the prioritized diagnosis calculation part 14 executes at S13 the diagnosis calculation processing shown in FIG. 7A and FIG. 7B. The diagnosis calculation processing is processing executed to calculate the prioritized diagnosis by the prioritized diagnosis calculation part 14.

In the diagnosis calculation processing, the prioritized diagnosis calculation part 14 first sets at S40 values of the item variables i1 to i4 to 0. The prioritized diagnosis calculation part 14 then checks at S41 whether the driving mode is the acceleration mode. Upon determination at S41 that the driving mode is the acceleration mode (YES), the prioritized diagnosis calculation part 14 performs checking at S42 on the diagnosis item indicated by the item variable i1. The diagnosis item indicated by the item variable i1 is the diagnosis item, for which the item number corresponding to the value of the item variable i1 is assigned among the diagnosis items assigned with the acceleration mode.

The prioritized diagnosis calculation part 14 checks at S42 whether the diagnosis item indicated by the item variable i1 has been undetected (that is, not detected yet) and whether all the uncontrollable conditions of the diagnosis item indicated by the item variable i1 have been satisfied. The prioritized diagnosis calculation part 14 checks, by execution of the processing of S42, whether the diagnosis item indicated by the item variable i1 should be set as the prioritized diagnosis.

Upon determination at S42 that the diagnosis item indicated by the item variable i1 has been undetected and all the uncontrollable conditions of the diagnosis item have been satisfied (YES), the prioritized diagnosis calculation part 14 sets at S43 the diagnosis item indicated by the item variable i1 as the prioritized diagnosis. The prioritized diagnosis calculation part 14 finishes the diagnosis calculation processing after execution of the processing of S43.

Upon determination at S42 that the diagnosis item indicated by the item variable i1 has been detected (NO), the prioritized diagnosis calculation part 14 increases at S44 the value of the item variable i1 by one. That is, the prioritized diagnosis calculation part 14 increments the item variable i1 (i1=i1+1). Upon determination at S42 that at least one of the uncontrollable conditions of the diagnosis item indicated by the item variable i1 has not been satisfied yet (NO), the prioritized diagnosis calculation part 14 executes the processing of S44.

The prioritized diagnosis calculation part 14 then checks at S45 whether the value of the item variable i1 is smaller than N1. Upon determination at S45 that the value of the item variable i1 is smaller than N1 (YES), the prioritized diagnosis calculation part 14 executes S42 again. Accordingly, upon determination at S42 that there are no diagnosis items to be set as the prioritized diagnosis, the prioritized diagnosis calculation part 14 repeats the processing of S42, S44 and S45 until the value of the Item variable i1 becomes equal to N1.

When the value of the item variable i1 becomes equal to N1, the acceleration mode has no more diagnosis items to be set as the prioritized diagnosis. Upon determination at S45 that the value of the item variable i1 has become equal to N1 (YES), the prioritized diagnosis calculation part 14 checks at S46 whether there is any diagnosis items to be detected in the constant speed mode. At S46, the constant speed mode is the driving mode, to which the driving mode calculation part 12 switches over from the acceleration mode. The prioritized diagnosis calculation part 14 checks at S46 whether the diagnosis item indicated by the item variable i2 has been undetected by varying the value of the item variable i2 from 0 to N2 sequentially.

Upon determination at S46 that there still remains the diagnosis item, which has been undetected yet, in the constant speed mode (YES), the prioritized diagnosis calculation part 14 outputs the signal for switching over the driving mode to the driving mode calculation part 12. The driving mode calculation part 12 switches over at S47 the driving mode from the acceleration mode to the constant speed mode based on the signal outputted from the prioritized diagnosis calculation part 14. The condition for the part 15 to perform checking of S45 is a switch-over condition.

After outputting the signal to the driving mode calculation part 12, the prioritized diagnosis calculation part 14 repeats the processing from S40 again. Upon determination at S46 that there remains no diagnosis item, which has been undetected, in the constant mode (NO), the prioritized diagnosis calculation part 14 does not set at S48 the prioritized diagnosis. After execution of the processing of S48, the prioritized diagnosis calculation part 14 finishes the diagnosis calculation processing.

Upon determination at S41 that the driving mode is not the acceleration mode (NO), the prioritized diagnosis calculation part 14 checks at S49 whether the driving mode is the constant speed mode. The prioritized diagnosis calculation part 14 performs checking at S50 on the diagnosis item indicated by the item variable i2. The diagnosis item indicated by the item variable i2 is the diagnosis item, for which the item number corresponding to the value of the item variable i2 is assigned among the diagnosis items assigned with the constant speed mode.

The prioritized diagnosis calculation part 14 checks at S50 whether the diagnosis item indicated by the item variable i2 has been undetected and whether all the uncontrollable conditions of the diagnosis item indicated by the item variable i2 have been satisfied. The prioritized diagnosis calculation part 14 checks, by execution of the processing of S50, whether the diagnosis item indicated by the item variable i2 should be set as the prioritized diagnosis.

Upon determination at S50 that the diagnosis item indicated by the Item variable i2 has been undetected and all the uncontrollable conditions of the diagnosis item have been satisfied (YES), the prioritized diagnosis calculation part 14 sets at S51 the diagnosis item indicated by the item variable i2 as the prioritized diagnosis. The prioritized diagnosis calculation part 14 finishes the diagnosis calculation processing after execution of the processing of S51.

Upon determination at S50 that the diagnosis item indicated by the item variable i2 has been detected (NO), the prioritized diagnosis calculation part 14 increases at S52 the value of the item variable i2 by one. That is, the prioritized diagnosis calculation part 14 increments the item variable i2 (i2=i2+1). Upon determination at S50 that at least one of the uncontrollable conditions of the diagnosis item indicated by the item variable i2 has not been satisfied yet (NO), the prioritized diagnosis calculation part 14 executes the processing of S52.

The prioritized diagnosis calculation part 14 then checks at S53 whether the value of the item variable i2 is smaller than N2. Upon determination at S53 that the value of the item variable i2 is smaller than N2 (YES), the prioritized diagnosis calculation part 14 executes S50 again. Accordingly, upon determination at S50 that there are no diagnosis items to be set as the prioritized diagnosis, the prioritized diagnosis calculation part 14 repeats the processing of S50, S52 and S53 until the value of the item variable i2 becomes equal to N2.

When the value of the item variable i2 becomes equal to N2, the constant speed mode has no more diagnosis items to be set as the prioritized diagnosis. Upon determination at S53 that the value of the item variable i2 has become equal to N2 (NO), the prioritized diagnosis calculation part 14 checks at S54 whether the rear distance is longer than the Interruption check distance. Upon determination at S54 that the rear distance is longer than the interruption check distance (YES), the prioritized diagnosis calculation part 14 checks at S55 whether there is any diagnosis items to be detected in the deceleration speed mode. At S55, the deceleration mode is the driving mode, to which the driving mode calculation part 12 switches over from the constant speed mode.

Upon determination at S55 that there still remains the diagnosis item, which has been undetected, in the deceleration mode (YES), the prioritized diagnosis calculation part 14 outputs the signal for switching over the driving mode to the driving mode calculation part 12. The driving mode calculation part 12 switches over at S56 the driving mode from the constant speed mode to the deceleration mode based on the signal outputted from the prioritized diagnosis calculation part 14. The condition for the prioritized diagnosis calculation part 14 to perform checking of S53 is the switch-over condition.

After outputting the signal to the driving mode calculation part 12, the prioritized diagnosis calculation part 14 repeats the processing from S40 again. Upon determination at S55 that there remains no diagnosis item, which has been undetected, in the deceleration mode (NO), the prioritized diagnosis calculation part 14 does not set at S57 the prioritized diagnosis. After execution of the processing of S57, the prioritized diagnosis calculation part 14 finishes the diagnosis calculation processing. Upon determination at S54 that the rear distance is not longer than the interruption check distance (NO), the prioritized diagnosis calculation part 14 executes the processing of S57 and finishes the diagnosis calculation processing.

Upon determination at S49 that the driving mode is not the constant speed mode (NO), the prioritized diagnosis calculation part 14 then checks at S58 whether the driving mode is the deceleration mode. Upon determination at S58 that the driving mode is the deceleration mode (YES), the prioritized diagnosis calculation part 14 performs checking at S59 on the diagnosis item indicated by the item variable i3. The diagnosis item indicated by the item variable i3 is the diagnosis item, for which the item number corresponding to the value of the item variable i3 is assigned, among the diagnosis items assigned with the deceleration mode.

The prioritized diagnosis calculation part 14 checks at S59 whether the diagnosis item indicated by the Item variable i3 has been undetected and whether all the uncontrollable conditions of the diagnosis item indicated by the item variable i3 have been satisfied. The prioritized diagnosis calculation part 14 checks, by execution of the processing of S59, whether the diagnosis item indicated by the item variable i3 should be set as the prioritized diagnosis.

Upon determination at S59 that the diagnosis item indicated by the item variable i3 has been undetected and all the uncontrollable conditions of the diagnosis item have been satisfied (YES), the prioritized diagnosis calculation part 14 sets at S60 the diagnosis item indicated by the item variable i3 as the prioritized diagnosis. The prioritized diagnosis calculation part 14 finishes the diagnosis calculation processing after execution of the processing of S60.

Upon determination at S59 that the diagnosis item indicated by the item variable i3 has been detected (NO), the prioritized diagnosis calculation part 14 increases at S66 the value of the item variable i3 by one. That is, the prioritized diagnosis calculation part 14 increments the item variable i3 (i3=i3+1). Upon determination at S59 that at least one of the uncontrollable conditions of the diagnosis item indicated by the item variable i3 has not been satisfied yet (NO), the prioritized diagnosis calculation part 14 executes the processing of S61.

The prioritized diagnosis calculation part 14 then checks at S62 whether the value of the item variable i3 is smaller than N3. Upon determination at S62 that the value of the item variable i3 is smaller than N3 (YES), the prioritized diagnosis calculation part 14 executes S59 again. Accordingly, upon determination at S59 that there are no diagnosis items to be set as the prioritized diagnosis, the prioritized diagnosis calculation part 14 repeats the processing of S59, S61 and S62 until the value of the item variable i3 becomes equal to N3.

When the value of the item variable i3 becomes equal to N3, the deceleration mode has no more diagnosis items to be set as the prioritized diagnosis. Upon determination at S62 that the value of the item variable i3 has become equal to N3 (NO), the prioritized diagnosis calculation part 14 checks at S63 whether there is any diagnosis items to be detected in the constant speed mode. At S63, the constant speed mode is the driving mode, to which the driving mode calculation part 12 switches over from the deceleration mode. Upon determination at S63 that there still remains the diagnosis item, which has been undetected, in the constant speed mode (YES), the prioritized diagnosis calculation part 14 outputs the signal for switching over the driving mode to the driving mode calculation part 12.

The driving mode calculation part 12 switches over at S64 the driving mode from the deceleration mode to the constant speed mode based on the signal outputted from the prioritized diagnosis calculation part 14. The condition for the prioritized diagnosis calculation part 14 to perform checking of S62 is the switch-over condition.

After outputting the signal to the driving mode calculation part 12, the prioritized diagnosis calculation part 14 repeats the processing from S40 again. Upon determination at S63 that there remains no diagnosis item, which has been undetected, in the constant speed mode (NO), the prioritized diagnosis calculation part 14 does not set at S65 the prioritized diagnosis. After execution of the processing of S65, the prioritized diagnosis calculation part 14 finishes the diagnosis calculation processing.

Upon determination at S58 that the driving mode is not the deceleration mode (NO), the prioritized diagnosis calculation part 14 then determines that the driving mode is the stop mode. Upon determination at S58 that the driving mode is not the deceleration mode (NO), the prioritized diagnosis calculation part 14 performs checking at S66 on the diagnosis item indicated by the item variable i4. The diagnosis item indicated by the item variable i4 is the diagnosis item, for which the item number corresponding to the value of the item variable i4 is assigned, among the diagnosis items assigned with stop mode.

The prioritized diagnosis calculation part 14 checks at S66 whether the diagnosis item indicated by the item variable i4 has been undetected and whether all the uncontrollable conditions of the diagnosis item indicated by the item variable i4 have been satisfied. The prioritized diagnosis calculation part 14 checks, by execution of the processing of S66, whether the diagnosis item indicated by the item variable i4 should be set as the prioritized diagnosis.

Upon determination at S66 that the diagnosis item indicated by the item variable i4 has been undetected and all the uncontrollable conditions of the diagnosis item have been satisfied (YES), the prioritized diagnosis calculation part 14 sets at S67 the diagnosis item indicated by the item variable i4 as the prioritized diagnosis. The prioritized diagnosis calculation part 14 finishes the diagnosis calculation processing after execution of the processing of S67.

Upon determination at S66 that the diagnosis item indicated by the item variable i4 has been detected (NO), the prioritized diagnosis calculation part 14 increases at S68 the value of the item variable i4 by one. That is, the prioritized diagnosis calculation part 14 increments the item variable i4 (i4=i4+1). Upon determination at S66 that at least one of the uncontrollable conditions of the diagnosis item indicated by the item variable i4 has not been satisfied yet (NO), the prioritized diagnosis calculation part 14 executes the processing of S68.

The prioritized diagnosis calculation part 14 then checks at S69 whether the value of the item variable i4 is smaller than N4. Upon determination at S66 that the value of the item variable i4 is smaller than N4 (YES), the prioritized diagnosis calculation part 14 executes S66 again. Accordingly, upon determination at S66 that there are no diagnosis items to be set as the prioritized diagnosis, the prioritized diagnosis calculation part 14 repeats the processing of S66, S68 and S69 until the value of the item variable i4 becomes equal to N4.

When the value of the item variable i4 becomes equal to N4, the acceleration mode has no more diagnosis items to be set as the prioritized diagnosis. Upon determination at S69 that the value of the item variable i4 has become equal to N4 (NO), the prioritized diagnosis calculation part 14 checks at S70 whether there is any diagnosis items to be detected in the constant speed mode. At S70, the constant speed mode is the driving mode, to which the driving mode calculation part 12 switches over from the stop mode. Upon determination at S70 that there still remains the diagnosis item, which has been undetected, in the constant speed mode (YES), the prioritized diagnosis calculation part 14 outputs the signal for switching over the driving mode to the driving mode calculation part 12.

The driving mode calculation part 12 switches over at S71 the driving mode from the stop mode to the constant speed mode based on the signal outputted from the prioritized diagnosis calculation part 14. The condition for the prioritized diagnosis calculation part 14 to perform checking of S69 is the switch-over condition.

After outputting the signal to the driving mode calculation part 12, the prioritized diagnosis calculation part 14 repeats the processing from S40 again. Upon determination at S70 that there remains no diagnosis item, which has been undetected, in the constant speed mode (NO), the prioritized diagnosis calculation part 14 does not set at S72 the prioritized diagnosis. After execution of the processing of S72, the prioritized diagnosis calculation part 14 finishes the diagnosis calculation processing.

After finishing the diagnosis calculation processing, the prioritized diagnosis calculation part 14 outputs a signal to the diagnosis control setting part 16. The diagnosis control setting part 16 checks at S14 shown in FIG. 5 whether the prioritized diagnosis has been set based on the signal inputted from the prioritized diagnosis calculation part 14.

Figure 8:
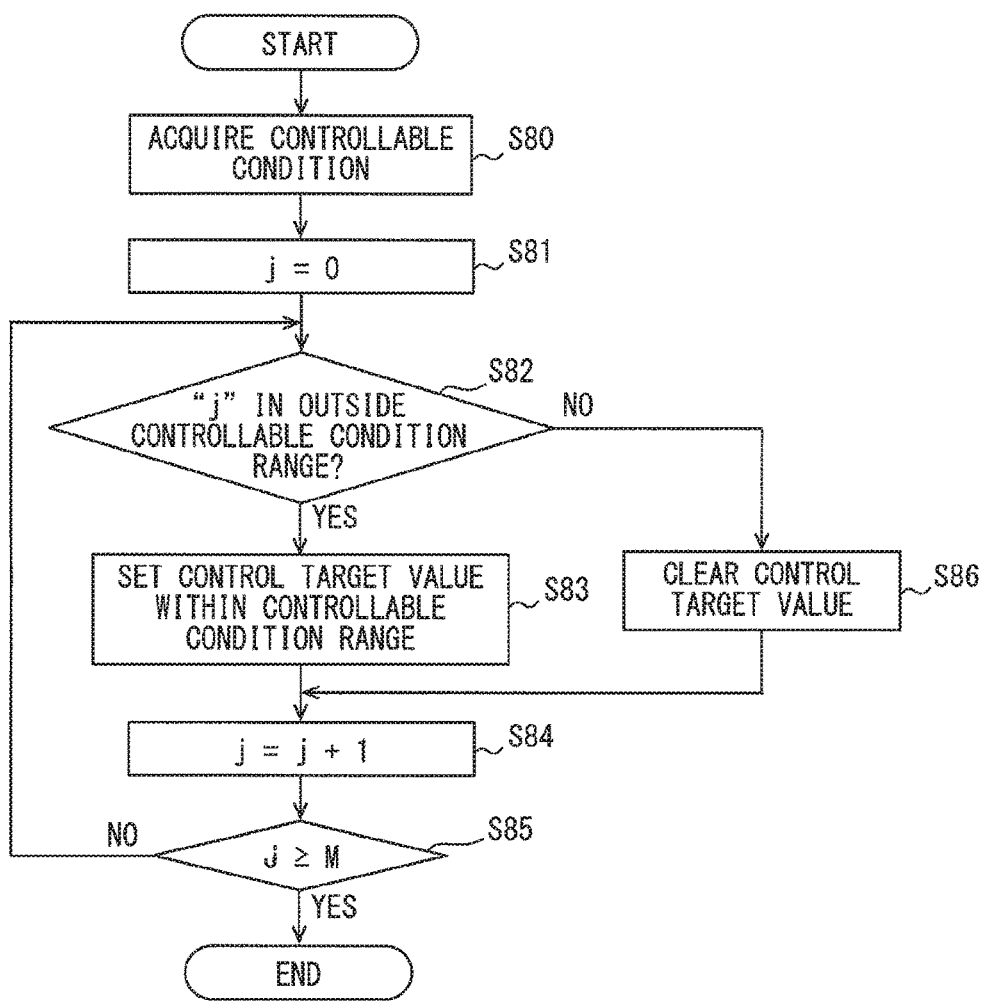
FIG. 8 is a flowchart showing steps of control setting processing.

Upon determination at S14 that the prioritized diagnosis has been set (YES), the diagnosis control setting part 16 performs the control setting processing shown in FIG. 8 at S15. The control setting processing is processing, by which the diagnosis control setting part 16 sets the control target value. In the control setting processing, the diagnosis control setting part 16 first acquires at S80 all the controllable conditions in the prioritized diagnosis from the storage part 30.

The diagnosis control setting part 16 then sets at S81 the value of the state variable j to 0. The diagnosis control setting part 16 next checks at S82 whether the vehicle operation state indicate by the state variable j is outside a range of the controllable condition. The vehicle operation state indicated by the state variable j is the vehicle operation state, to which a state number corresponding to the value of the state variable j is assigned.

Upon determination at S82 that the vehicle operation state indicated by the state variable j is outside the range of the controllable condition (YES), the diagnosis control setting part 16 sets at S83 the control target value of the vehicle operation state indicated by the state variable j to a value, which is inside the range of the controllable condition. The diagnosis control setting part 16 sets at S83 the control target value to a value, which is closest to the present vehicle operation state, in the range of the controllable condition.

As shown in FIG. 4, the state number of the throttle open angle is set to 0, for example. In a case that the catalyst deterioration detection is set as the prioritized diagnosis, throttle open angle of 30° to 40° is set as the diagnosis condition. The diagnosis condition of the throttle open angle is the controllable condition. Thus, in a case that the catalyst deterioration detection is set as the prioritized diagnosis and the value of the state variable j is 0, the diagnosis control setting part 16 checks at S82 whether the throttle open angle indicated by the open angle sensor 206 is outside the range of 30° to 40°. When the throttle open angle indicated by the open angle sensor 206 is smaller than 30°, the diagnosis control setting part 16 sets the control target value for the throttle open angle to 30°.

The diagnosis control setting part 16 next increases at S84 the value of the state variable j by one. That is, the diagnosis control setting part 16 increments the state variable j (J=j+1). The diagnosis control setting part 16 then checks at S85 whether the value of the state variable j is equal to or larger than M. Upon determination at S85 that the value of the state variable j is smaller than M (NO), the diagnosis control setting part 16 executes the processing of S82 again.

Upon determination at S82 that the state indicted by the state variable j is inside the range of the controllable condition (NO), the diagnosis control setting part 16 dears at S86 the control target value. By clearing the control target value, the diagnosis control setting part 16 sets the control target value sets the control target value to a value, which corresponds to the automatic driving. Upon determination at S82 that there is no controllable condition (NO), which corresponds to the state variable j, the diagnosis control setting part 16 executes the processing of S86. That is, the diagnosis control setting part 16 executes the processing of S86 when the controllable condition corresponding to the state variable j is N/A at S82. The diagnosis control setting part 16 executes the processing of S84 after execution of the processing of S86.

The diagnosis control setting part 16 repeats the processing of S82 to 586 until the value of the state variable j becomes equal to M. Upon determination at S85 that the value of the state variable j has become equal to M, the diagnosis control setting part 16 finishes the control setting processing. After finishing the control setting processing, the diagnosis control setting part 16 finishes the diagnosis execution rate increasing processing.

Upon determination at S10 that the vehicle is not traveling by the automatic driving (NO), the driving mode calculation part 12 outputs a signal, which indicates that the vehicle is not traveling under the automatic driving, to the diagnosis control setting part 16. The diagnosis control setting part 16 dears at S16 the control target value based on the signal outputted from the driving mode calculation part 12. Upon determination at S12 that the driving mode is not set (NO), the prioritized diagnosis calculation part 14 outputs a signal, which indicates no setting of the driving mode, to the diagnosis control setting part 16. The diagnosis control setting part 16 executes the processing of S16 based on the signal outputted from the prioritized diagnosis calculation part 14. Further, upon determination at S14 that the prioritized diagnosis is not set (NO), the diagnosis control setting part 16 executes the processing of S16.

The ECU 100 described above provides the following advantages.

In the present embodiment, each diagnosis item is assigned to the driving mode, the diagnosis condition of which is most easily satisfied. The diagnosis control setting part 16 therefore sets the control target value so that the diagnosis item, the diagnosis condition of which is most easily satisfied in the set driving mode, is satisfied. As a result, even when the control target value is set to satisfy the diagnosis condition, the travel state of the vehicle is less likely to change. It is thus possible to suppress the riding comfortableness in the vehicle from degrading. Further, since the diagnosis control setting part 16 sets the control target value to satisfy the diagnosis item, it is possible to attain the diagnosis execution rate value as desired or required.

In the present embodiment, when the uncontrollable condition of the diagnosis item, which is set as the prioritized diagnosis, other diagnosis item assigned to the set driving mode is set as the prioritized diagnosis. Thus, even when the uncontrollable condition is not satisfied, the control target value is set so that the diagnosis condition of other diagnosis item is set. For this reason, it is possible to attain effectively the diagnosis execution rate value as desired or required.

In the present embodiment, when the diagnosis of the diagnosis item, which is set as the prioritized diagnosis, the other diagnosis item, which is assigned to the set driving mode, is set as the prioritized diagnosis. Thus, the prioritized diagnosis is set sequentially so that the diagnosis of plural diagnosis items assigned to the set driving mode is finished. It is thus possible to attain effectively the diagnosis execution rate value as desired or required.

In the present embodiment, when the diagnosis of the diagnosis item assigned to the set driving mode is finished, the driving mode is switched over. Thus the control target value is set so that the diagnosis condition of the diagnosis item assigned to the switched-over driving mode is satisfied. For this reason, the prioritized diagnosis is set sequentially so that the diagnosis of the diagnosis item in the plural driving mode is finished. It is thus possible to attain effectively the diagnosis execution rate value as desired or required.

The ECU 100 is not limited to the embodiment described above but may be implemented differently in other embodiments.

Figure 9:
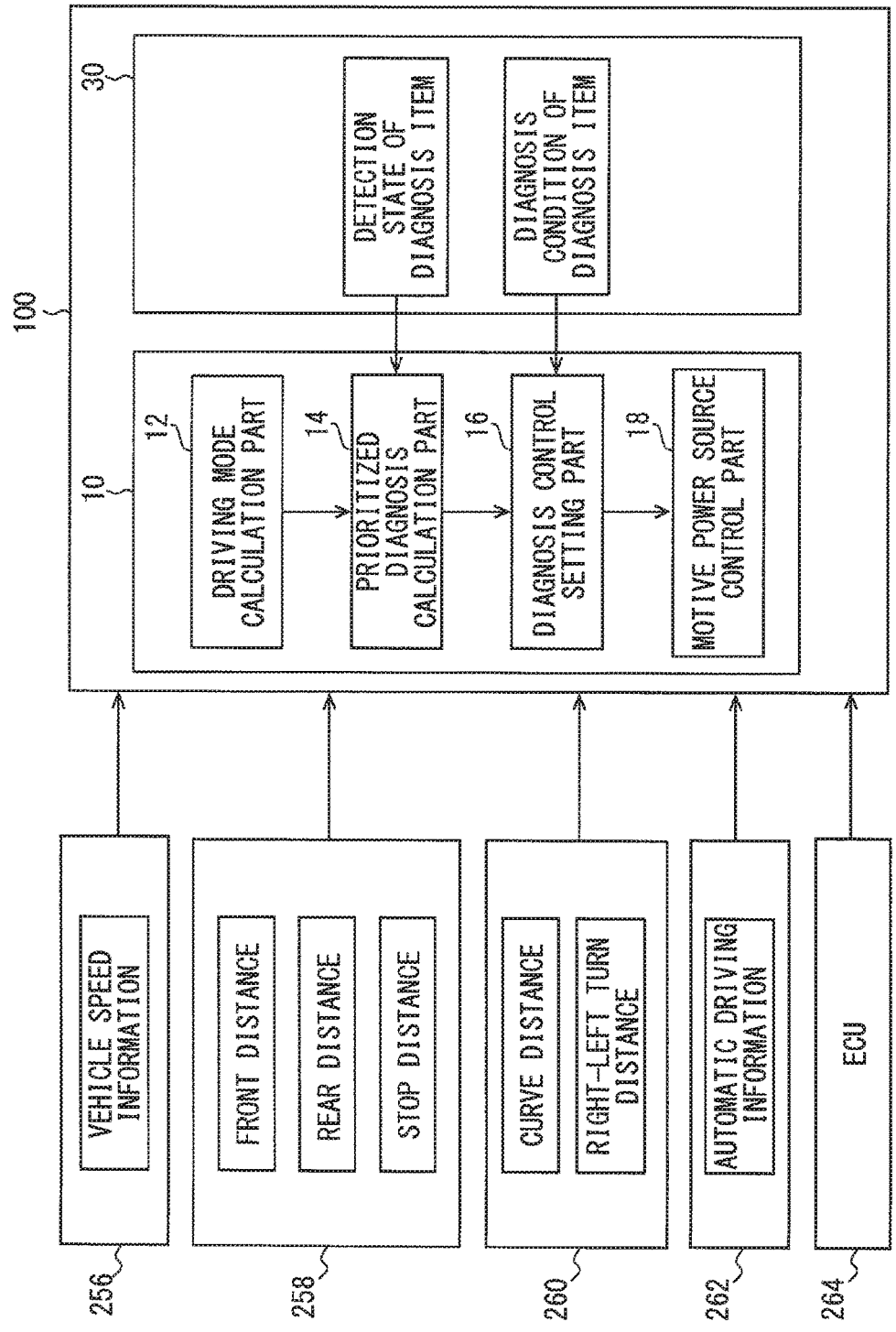
FIG. 9 is a block diagram showing a general configuration of a first modification of the ECU.

In the embodiment described above, the ECU 100 is exemplified to include the diagnosis part 20. Without being limited to this example, as shown in FIG. 9 as a modification example, the ECU 100 may be configured to have no diagnosis part 20. That is, the ECU 100 may be configured not to perform the failure diagnosis of the vehicle. In the modification example, an ECU 264, which is different from the ECU 100, is provided. The ECU 264 performs the failure diagnosis of the vehicle. The ECU 264 is connected to the ECU 100 through CAN. The ECU 100 varies the detection state of the diagnosis item based on the signal from the ECU 264.

In the embodiment described above, each driving mode is exemplified to be assigned with plural diagnosis items. Without being limited to this, only one diagnosis item may be assigned to the driving mode.

In the embodiment described above, the diagnosis item is exemplified to have both of the controllable condition and the uncontrollable condition. The diagnosis item may have only the controllable condition.

In the embodiment described above, four driving modes are exemplified. Without being limited to this, the number of driving modes may be any plural numbers. For example, the number of driving modes may be smaller than four or larger than four.

In the embodiment described above, the driving mode calculation part 12 is exemplified to set the driving mode based on the vehicle speed information and the distance information. Without being limited to this, the driving mode calculation part 12 may set the driving mode based on only one of the vehicle speed information and the distance information.

What is claimed is:

1. An electronic control unit for a vehicle, which travels by automatic driving and performs diagnosis about plural diagnosis items for diagnosing presence or absence of abnormality, the electronic control unit receiving at least one of surrounding environment information indicating a surrounding environment of the vehicle and vehicle speed information indicating a vehicle speed from an external device and controlling a motive power source of the vehicle based on at least one of the surrounding environment information and the vehicle speed information, the electronic control unit comprising:
a mode setting part configured to set plural driving modes, each of which indicates a travel state of the vehicle based on at least one of the vehicle speed information and the surrounding environment information when the vehicle travels by the automatic driving;
an item setting part configured to set one of the plural diagnosis items as a prioritized item, which is diagnosed with priority over other diagnosis items of the plural diagnosis items;
a storage configured to store plural diagnosis conditions in correspondence to each diagnosis item of the plural diagnosis items for starting diagnosis of the vehicle, the plural diagnosis conditions being conditions indicating a vehicle operation state;
a target setting part configured to set a control target value, which is a target value for controlling the motive power source; and
a motive power source control part configured to control the motive power source based on the control target value, wherein
the each diagnosis item is assigned to one of the plural driving modes, which is predetermined to satisfy the plural diagnosis conditions for the each diagnosis item,
the item setting part is configured to set one of the plural diagnosis items, which is assigned to a set driving mode by the mode setting part, as the prioritized item, when the set driving mode is set, and
the target setting part is configured to set the control target value so that the motive power source is controlled to attain a state, which satisfies the plural diagnosis conditions of the prioritized item, when the prioritized item is set by the item setting part.

2. The electronic control unit according to claim 1, wherein:
at least one driving mode of the plural driving modes is assigned with at least two diagnosis items of the plural diagnosis items;
the plural diagnosis conditions, which are provided in correspondence to at least one of the at least two diagnosis items assigned to the at least one driving mode, includes a controllable condition and an uncontrollable condition as the plural diagnosis conditions indicating the vehicle operation state, the controllable condition being set to be controllable by the motive power source control part, and the uncontrollable condition being set to be uncontrollable by the motive power source control part;
the item setting part checks whether the uncontrollable condition is satisfied, when the plural diagnosis conditions of the prioritized item include the uncontrollable condition; and
when the mode setting part sets the at least one driving mode assigned with the at least two diagnosis items, the plural diagnosis conditions of the prioritized item include the uncontrollable condition and the uncontrollable condition is not satisfied, another diagnosis item of the at least two diagnosis items different from the diagnosis item set as the prioritized item is set as the prioritized item of the at least two diagnosis items assigned to the at least one driving mode set by the mode setting part.

3. The electronic control unit according to claim 1, wherein:
at least one driving mode of the plural driving modes is assigned with at least two diagnosis items of the plural diagnosis items;
the item setting part checks whether the diagnosis of the prioritized item has been finished; and
when the mode setting part sets the at least one driving mode assigned with the at least two diagnosis items and the item setting part determines that the diagnosis of the prioritized item has been finished, the item setting part sets another diagnosis item of the at least two diagnosis items different from the diagnosis item set as the prioritized item as the prioritized item among the plural diagnosis items assigned to the at least one driving mode set by the mode setting part.

4. The electronic control unit according to claim 1, wherein:
the item setting part checks whether diagnosis of the prioritized item has been finished;
when the diagnosis of the prioritized item is determined to have been finished, the item setting part determines that a switchover condition for performing driving mode switchover in the plural driving modes is satisfied; and
when the switchover condition is determined to have been satisfied by the item setting part, the mode setting part performs the driving mode switchover from one driving mode to another driving mode in the plural driving modes.

5. The electronic control unit according to claim 4, wherein:
when the switchover condition is determined to have been satisfied, the item setting part checks whether diagnosis of the diagnosis item of the another driving mode, to which the diagnosis is switched over, has been finished;
when the diagnosis is determined to have been finished, the item setting part does not set the prioritized item;
when the prioritized item is not set, the target setting part sets the control target value to a value, which is based on the automatic driving; and
when the item setting part determines that the switchover condition has been satisfied and the diagnosis of the diagnosis item assigned to the another driving mode has been unfinished, the driving mode setting part switches over the driving mode.

6. The electronic control unit according to claim 5, wherein:
the mode setting part receives candidate position information as the surrounding environment information from the external device in addition to the vehicle speed information, the candidate position information being a candidate for changing the travel state of the vehicle; and
the mode setting part sets, as the plural driving modes, either one of an acceleration mode, a deceleration mode, a constant speed mode and a stop mode based on the vehicle speed information and the surrounding environment information, the acceleration mode being set when an arrival time required for the vehicle to arrive at the candidate position is equal to or longer than a time threshold value and the vehicle speed is lower than a speed threshold value, the deceleration mode being set when the arrival time is shorter than the time threshold value and a distance from the vehicle to a rear following vehicle is equal to or longer than a distance threshold value, the constant speed mode being set when the arrival time is equal to or longer than the time threshold value and the vehicle speed is equal to or higher than the speed threshold value, and the stop mode being set when the vehicle speed is zero.

7. The electronic control unit according to claim 6, wherein:
the mode setting part sets none of the plural driving modes, when the arrival time is shorter than the time threshold value, the distance to the rear following vehicle is shorter than the distance threshold value and the vehicle speed is negative; and
the target setting part sets the control target value to a value corresponding to the automatic driving, when none of the plural driving modes is set.

8. The electronic control unit according to claim 6, wherein:
the mode setting part receives, as the surrounding environment information, distance information, which indicates at least one of a right-left turn distance, which is a distance to a position for the vehicle to make a right turn or a left turn, a curve distance, which is a distance to a position for the vehicle to enter a curve, a stop distance, which is a distance to a position for the vehicle to make a temporary stop, and an obstacle distance, which is a distance to a forward obstacle existing in a front direction of the vehicle; and
the mode setting part calculates the arrival time based on the distance information by dividing one of the distances of the right-left turn distance, the curve distance, the stop distance and the obstacle distance by the vehicle speed.

9. An electronic control unit for a vehicle, which travels by automatic driving and performs diagnosis about plural diagnosis items for diagnosing presence or absence of abnormality, the electronic control unit receiving at least one of surrounding environment information indicating a surrounding environment of the vehicle and vehicle speed information indicating a vehicle speed from an external device and controlling a motive power source of the vehicle based on at least one of the surrounding environment information and the vehicle speed information, the electronic control unit comprising:
a microcomputer, the microcomputer is configured to
set plural driving modes, each of which indicates a travel state of the vehicle based on at least one of the vehicle speed information and the surrounding environment information when the vehicle travels by the automatic driving;
set one of the plural diagnosis items as a prioritized item, which is diagnosed with priority over other diagnosis items of the plural diagnosis items;
store plural diagnosis conditions in correspondence to each diagnosis item of the plural diagnosis items for starting diagnosis of the vehicle, the plural diagnosis conditions being conditions indicating a vehicle operation state;
set a control target value, which is a target value for controlling the motive power source; and
control the motive power source based on the control target value, wherein
the each diagnosis item is assigned to one of the plural driving modes, which is predetermined to satisfy the plural diagnosis conditions for the each diagnosis item,
the microcomputer is configured to set one of the plural diagnosis items, which is assigned to a set driving mode by the microcomputer, as the prioritized item, when the set driving mode is set, and
the microcomputer is configured to set the control target value so that the motive power source is controlled to attain a state, which satisfies the plural diagnosis conditions of the prioritized item, when the prioritized item is set by the microcomputer.

10. The electronic control unit according to claim 9, wherein:

at least one driving mode of the plural driving modes is assigned with at least two diagnosis items of the plural diagnosis items;

the plural diagnosis conditions, which are provided in correspondence to at least one of the at least two diagnosis items assigned to the at least one driving mode, includes a controllable condition and an uncontrollable condition as the plural diagnosis conditions indicating the vehicle operation state, the controllable condition being set to be controllable by the microcomputer, and the uncontrollable condition being set to be uncontrollable by the microcomputer;

the microcomputer is further configured to check whether the uncontrollable condition is satisfied, when the plural diagnosis conditions of the prioritized item include the uncontrollable condition; and when the microcomputer sets the at least one driving mode assigned with the at least two diagnosis items, the plural diagnosis conditions of the prioritized item include the uncontrollable condition and the uncontrollable condition is not satisfied, another diagnosis item of the at least two diagnosis items different from the diagnosis item set as the prioritized item is set as the prioritized item of the at least two diagnosis items assigned to the at least one driving mode set by the microcomputer.

11. The electronic control unit according to claim 9, wherein:

at least one driving mode of the plural driving modes is assigned with at least two diagnosis items of the plural diagnosis items;

the microcomputer is further configured to check whether the diagnosis of the prioritized item has been finished; and when the microcomputer sets the at least one driving mode assigned with the at least two diagnosis items and microcomputer determines that the diagnosis of the prioritized item has been finished, the microcomputer sets another diagnosis item of the at least two diagnosis items different from the diagnosis item set as the prioritized item as the prioritized item among the plural diagnosis items assigned to the at least one driving mode set by the microcomputer.

12. The electronic control unit according to claim 9, wherein the microcomputer is further configured to:

check whether diagnosis of the prioritized item has been finished;

when the diagnosis of the prioritized item is determined to have been finished, determine that a switchover condition for performing driving mode switchover in the plural driving modes is satisfied; and when the switchover condition is determined to have been satisfied, perform the driving mode switchover from one driving mode to another driving mode in the plural driving modes.

13. The electronic control unit according to claim 12, wherein the microcomputer is further configured to:

when the switchover condition is determined to have been satisfied, check whether diagnosis of the diagnosis item of the another driving mode, to which the diagnosis is switched over, has been finished;

when the diagnosis is determined to have been finished, not set the prioritized item;

when the prioritized item is not set, set the control target value to a value, which is based on the automatic driving; and when the microcomputer determines that the switchover condition has been satisfied and the diagnosis of the diagnosis item assigned to the another driving mode has been unfinished, switch over the driving mode.

14. The electronic control unit according to claim 13, wherein the microcomputer is further configured to:

receive candidate position information as the surrounding environment information from the external device in addition to the vehicle speed information, the candidate position information being a candidate for changing the travel state of the vehicle; and set, as the plural driving modes, either one of an acceleration mode, a deceleration mode, a constant speed mode and a stop mode based on the vehicle speed information and the surrounding environment information, the acceleration mode being set when an arrival time required for the vehicle to arrive at the candidate position is equal to or longer than a time threshold value and the vehicle speed is lower than a speed threshold value, the deceleration mode being set when the arrival time is shorter than the time threshold value and a distance from the vehicle to a rear following vehicle is equal to or longer than a distance threshold value, the constant speed mode being set when the arrival time is equal to or longer than the time threshold value and the vehicle speed is equal to or higher than the speed threshold value, and the stop mode being set when the vehicle speed is zero.

15. The electronic control unit according to claim 14, wherein the microcomputer is further configured to:

set none of the plural driving modes, when the arrival time is shorter than the time threshold value, the distance to the rear following vehicle is shorter than the distance threshold value and the vehicle speed is negative; and set the control target value to a value corresponding to the automatic driving, when none of the plural driving modes is set.

16. The electronic control unit according to claim 14, wherein the microcomputer is further configured to:

receive, as the surrounding environment information, distance information, which indicates at least one of a right-left turn distance, which is a distance to a position for the vehicle to make a right turn or a left turn, a curve distance, which is a distance to a position for the vehicle to enter a curve, a stop distance, which is a distance to a position for the vehicle to make a temporary stop, and an obstacle distance, which is a distance to a forward obstacle existing in a front direction of the vehicle; and calculate the arrival time based on the distance information by dividing one of the distances of the right-left turn distance, the curve distance, the stop distance and the obstacle distance by the vehicle speed.

* * * * *